US012011695B2

(12) United States Patent
Williams et al.

(10) Patent No.: US 12,011,695 B2
(45) Date of Patent: Jun. 18, 2024

(54) CROSS-FLOW ASSEMBLY AND METHOD FOR MEMBRANE EMULSIFICATION CONTROLLED DROPLET PRODUCTION

(71) Applicant: MICROPORE TECHNOLOGIES LTD, Cleveland (GB)

(72) Inventors: Bruce Williams, Cleveland (GB); Sam Trotter, Cleveland (GB); Richard Holdich, Cleveland (GB); David Palmer, Cleveland (GB); David Hayward, Cleveland (GB)

(73) Assignee: MICROPORE TECHNOLOGIES LIMITED (GB)

( * ) Notice: Subject to any disclaimer, the term of this patent is extended or adjusted under 35 U.S.C. 154(b) by 926 days.

(21) Appl. No.: 16/763,752

(22) PCT Filed: Nov. 13, 2018

(86) PCT No.: PCT/GB2018/053290
§ 371 (c)(1),
(2) Date: May 13, 2020

(87) PCT Pub. No.: WO2019/092461
PCT Pub. Date: May 16, 2019

(65) Prior Publication Data

US 2020/0368699 A1 Nov. 26, 2020

(30) Foreign Application Priority Data

Nov. 13, 2017 (GB) ..................................... 1718680
Jan. 30, 2018 (GB) ..................................... 1801459

(51) Int. Cl.
*B01F 23/00* (2022.01)
*B01F 23/41* (2022.01)
(Continued)

(52) U.S. Cl.
CPC ........... *B01F 23/41* (2022.01); *B01F 23/451* (2022.01); *B01F 25/31331* (2022.01);
(Continued)

(58) Field of Classification Search
CPC .... B01F 25/3142; B01F 23/451; B01F 23/41; B01F 25/31331
See application file for complete search history.

(56) References Cited

FOREIGN PATENT DOCUMENTS

| | | |
|---|---|---|
| WO | 97/36674 | 10/1997 |
| WO | 2014/006384 | 1/2014 |

OTHER PUBLICATIONS

Machine Translation of WO2014006384A3 to Holdich (Year: 2014).*
(Continued)

*Primary Examiner* — Anshu Bhatia
(74) *Attorney, Agent, or Firm* — K&L GATES LLP

(57) ABSTRACT

There is described a cross-flow apparatus for producing an emulsion or dispersion by dispersing a first phase in a second phase; said cross-flow apparatus comprising: an outer tubular sleeve (2) provided with a first inlet (3) at a first end (4); an emulsion outlet (5); and a second inlet (7), distal from and inclined relative to the first inlet; a tubular membrane provided with a plurality of pores and adapted to be positioned inside the tubular sleeve (2); and optionally an insert adapted to be located inside the tubular membrane, said insert comprising an inlet end and an outlet end, each of the inlet end and an outlet end being provided with chamfered region; the chamfered region is provided with a plurality of orifices and a furcation plate.

31 Claims, 5 Drawing Sheets

(51) Int. Cl.

| | |
|---|---|
| ***B01F 23/451*** | (2022.01) |
| ***B01F 25/313*** | (2022.01) |
| ***B01F 25/314*** | (2022.01) |
| *B01F 101/06* | (2022.01) |
| *B01F 101/22* | (2022.01) |
| *B01F 101/30* | (2022.01) |

(52) U.S. Cl.
CPC ...... *B01F 25/3142* (2022.01); *B01F 23/4145* (2022.01); *B01F 2101/06* (2022.01); *B01F 2101/22* (2022.01); *B01F 2101/30* (2022.01)

(56) References Cited

OTHER PUBLICATIONS

WO 2014/006384 to Holdich cited in the IDS filed May 13, 2020 (Year: 2014).*
PCT International Search Report and PCT Written Opinion mailed from the International Searching Authority for International application No. PCT/GB2018/053290 dated Mar. 22, 2019 (17 pages).

* cited by examiner

CROSS-FLOW ASSEMBLY AND METHOD FOR MEMBRANE EMULSIFICATION CONTROLLED DROPLET PRODUCTION

CROSS REFERENCE TO RELATED APPLICATIONS

This is the national phase under 35 U.S.C. § 371 of International Application No. PCT/GB2018/053290, filed on Nov. 13, 2018, which claims priority to and the benefit of United Kingdom Patent Application No. 1718680.0 filed on Nov. 13, 2017 and United Kingdom Patent Application No. 1801459.7 filed on Jan. 30, 2018, the entire disclosures of each of which are incorporated by reference herein.

FIELD OF THE INVENTION

The present invention relates to a novel cross-flow assembly for controlled droplet production by membrane emulsification.

More particularly, the present invention relates to a novel cross-flow assembly for controlled droplet production by membrane emulsification, which provides droplets with a good coefficient of variation (CV) at high throughput or flux (litres per square metre per hour or $L/m^2/h$ or LMH).

BACKGROUND TO THE INVENTION

Apparatus and methods for generating emulsions of oil-in-water or water-in-oil; or multiple emulsions, such as water-oil-water and oil-water-oil; or dispersions of small sized capsules containing solids or fluids, are of considerable economic importance. Such apparatus and methods are used in a variety of industries, for example, for generating creams, lotions, pharmaceutical products, e.g. microcapsules for delayed release pharmaceutical products, pesticides, paints, varnishes, spreads and other foods.

In several instances, it is desirable to encase particles in a covering of another phase, such as a wall or shell material (microcapsules), to produce a barrier to the ingredient readily dissolving or reacting too quickly in its application. One such example is a delayed release pharmaceutical product.

In many applications it is desirable to employ a reasonably consistent droplet or dispersion, size.

By way of example only, in the case of a controlled release pharmaceutical product a narrow consistent microcapsule size can result in a predictable release of the encapsulated product; whereas a wide droplet size distribution can result in an undesirable rapid release of the product from fine particles (due to their high surface area to volume ratio) and a slow release from the larger particles. However, it will be understood that in some circumstances it may be desirable to have a controlled distribution of microcapsule size.

Current emulsion manufacturing techniques use systems comprising stirrers and homogenisers. In such systems a two phase dispersion with large droplets is forced though a high shear region near the stirrer, or through valves and nozzles to induce turbulence and thereby to break up the drops into smaller ones. However, it is not easily possible to control the droplet sizes achieved and the size range of droplet diameters is usually large. This is a consequence of the fluctuating degree of turbulence found in these systems and the exposure of the droplets to a variable shear field.

When manufacturing dispersions in which a semisolid is being produced there are additional disadvantages due to the highly non-Newtonian flow behaviour of the system in which high speed stirrers are only effective at distances close to the stirrer. Pressure drops are high with homogenisers and productivity is low, due to the nature of the high apparent viscosity of these systems. Hence, the energy consumption is also high. Also, such devices do not perform well when the moiety to be dispersed is a gel, or setting liquid, or if it contains solids. The equipment may become damaged by such products.

In recent years, there has been much research interest in the generation of emulsions using microfilter membranes. International patent application No. WO 01/45830 describes an apparatus for dispersing a first phase in a second phase using a rotating membrane.

U.S. Pat. No. 4,201,691 describes an apparatus for generating a multiple phase dispersion wherein the fluid to be injected into the immiscible continuous phase is passed through porous media zones to create the drops of dispersion within the immiscible continuous phase.

International Patent Application No. WO2012/094595 describes a method of producing spheroidal polymer beads having a uniform size which are prepared by polymerizing uniformly sized monomer droplets formed by dispersing a polymerisable monomer phase over a cross-flow membrane into an aqueous phase.

As can be seen from Figure of WO2012/094595 holes in the membrane are conical or concave in shape. One disadvantage of the conical or concave hole shape is that the shear force experienced by the droplet may lack consistency.

Pedro S. Silva, et al, "Azimuthally Oscillating Membrane Emulsification for Controlled Droplet Production", AIChE Journal 2015 Vol, 00, No. 00; describes a membrane emulsification system comprising a tubular metal membrane which is periodically azimuthally oscillated in a gently cross flowing continuous phase.

However, all of the aforesaid methods comprise moving systems, which either require agitation of the system or the use of a mechanically driven or oscillated membrane.

In some of the prior art systems droplets with a good coefficient of variation (CV) can be produced, but only at relatively low flux (litres per square metre per hour or LMH) of the disperse phase.

Furthermore, in most known systems the productivity can be improved by recirculation of the emulsion. However, recirculation is likely to result in droplet damage within the pump and other fittings present in the system, leading to poor control over the droplet size distribution.

SUMMARY OF THE INVENTION

Therefore, there is a need for a system and a method of production that provides droplets that possess a good coefficient of variation (CV) whilst achieving a high flux (LMH) at a desirable concentration. Such a system or method will be advantageous when producing droplets on a large scale.

Therefore, according to a first aspect of the invention there is provided a cross-flow apparatus for producing an emulsion or dispersion by dispersing a first phase in a second phase; said cross-flow apparatus comprising:

- an outer tubular sleeve provided with a first inlet at a first end; an emulsion outlet; and a second inlet, distal from and inclined relative to the first inlet;
- a tubular membrane provided with a plurality of pores and adapted to be positioned inside the tubular sleeve; and
- optionally an insert adapted to be located inside the tubular membrane, said insert comprising an inlet end and an outlet end, each of the inlet end and an outlet end being provided with chamfered region; the chamfered region is provided with a plurality of orifices and a furcation plate.

Cross-flow membrane emulsification uses the flow of the continuous phase to detach droplets from the membrane pores.

The position of the emulsion outlet may vary depending upon the direction of flow of the disperse phase, i.e. from inside the membrane to outside or from outside the membrane to inside. If the flow of the disperse phase is from outside the membrane to inside then the emulsion outlet will generally be at a second end of the tubular sleeve. If the flow of the disperse phase is from inside the membrane to outside then the emulsion outlet may be a side branch or at the end.

In one aspect of the invention the cross-flow apparatus includes an insert as herein described and the first inlet is a continuous phase first inlet and the second inlet is a disperse phase inlet; such that the disperse phase travels from outside the tubular membrane to inside.

In another aspect of the invention the cross-flow apparatus does not include an insert and the first inlet is a disperse phase first inlet and the second inlet is a continuous phase inlet; such that the disperse phase travels from inside the tubular membrane to outside.

When an insert is present and the tubular membrane is positioned inside the outer sleeve, the spacing between the insert and the tubular membrane may be varied, depending upon the size of droplets desired, etc. Generally, the insert will be located centrally within the tubular membrane, such that the spacing between the insert and the membrane will comprise an annulus, of equal or substantially equal dimensions at any point around the insert. Thus, for example, the spacing may be from about 0.05 to about 10 mm (distance between the outer wall of the insert and the inner wall of the membrane), from about 0.1 to about 10 mm, from about 0.25 to about 10 mm, or from about 0.5 to about 8 mm, or from about 0.5 to about 6 mm, or from about 0.5 to about 5 mm, or from about 0.5 to about 4 mm, or from about 0.5 to about 3 mm, or from about 0.5 to about 2 mm, or from about 0.5 to about 1 mm.

When the tubular membrane is positioned inside the outer sleeve, the spacing between the tubular membrane and the outer sleeve may be varied, depending upon the size of droplets desired, etc. Generally, the tubular membrane will be located centrally within the outer sleeve, such that the spacing between the membrane and the sleeve will comprise an annulus, of equal or substantially equal dimensions at any point around the tubular membrane. Thus, for example, the spacing may be from about 0.5 to about 10 mm (distance between the outer wall of the membrane and the inner wall of the sleeve), or from about 0.5 to about 8 mm, or from about 0.5 to about 6 mm, or from about 0.5 to about 5 mm, or from about 0.5 to about 4 mm, or from about 0.5 to about 3 mm, or from about 0.5 to about 2 mm, or from about 0.5 to about 1 mm.

In an alternative embodiment of the invention the insert is tapered, such that the spacing between the insert and the tubular membrane may be divergent along the length of the membrane. The spacing and the amount of divergence varied, depending upon the gradient of the tapered insert, the size of droplets desired, size distribution, etc. It will be understood by the person skilled in the art that depending upon the direction of taper, the spacing between the insert and the tubular membrane may be divergent or convergent along the length of the membrane. The use of a tapered insert may be advantageous in that a suitable taper may allow the shear to be held constant for a particular formulation and set of flow conditions. Thus, the tapered insert may be used to control variation in drop size resulting from changes in fluid properties, such as viscosity, as the emulsion concentration increases through its path along the length of the membrane.

In an alternative embodiment of the invention the cross-flow apparatus may comprise more than one tubular membrane located inside the outer tubular sleeve, i.e. a plurality of tubular membranes. When a plurality of tubular membranes is provided, each membrane may optionally have an insert, as herein described, located inside it. A plurality of membranes may be grouped as a cluster of membranes positioned alongside each other. Desirably the membranes are not in direct contact with each other. It will be understood that the number of membranes may vary depending upon, inter alia, the nature of the droplets to be produced. Thus, by way of example only, when a plurality of tubular membranes is present, the number of membranes may be from 2 to 100.

The inclined second inlet provided in the outer tubular sleeve will generally comprise a branch of the tubular sleeve and may be perpendicular to the longitudinal axis of the tubular sleeve. The position of the branch or second inlet may be varied and may depend upon the plane of the membrane. For example, if, in use, the axis of membrane is in a vertical plane, then the branch or second inlet may be located at the top or bottom of the cross-flow apparatus; and may also depend upon whether the dispersed phase is more or less dense than the continuous phase. Such an arrangement may be advantageous in that at the start of injection the dispersed phase can steadily displace the continuous phase, rather than tending to mix due to density differences. In one embodiment the position of the branch or second inlet will be substantially equidistant from the inlet and the outlet, although it will be understood by the person skilled in the art that the location of this second inlet may be varied. It is also within the scope of the present invention for more than one branch inlet to be provided. For example the use of a dual branch may suitably allow for bleeding the continuous phase during priming, or flushing for cleaning, or drainage/venting for sterilisation.

The inlet and outlet ends of the outer sleeve will generally be provided with a seal assembly. Although the seal assemblies at the inlet and outlet ends of the outer sleeve may be the same or different, preferably each of the seal assemblies is the same.

Normal O-ring seals involve the O-ring being compressed between the two faces on which the seal is required—in a variety of geometries. Commercially available O-ring seals are provided with different groove options with standard dimensions. Each seal assembly will comprise a tubular ferrule provided with a flange at each end. A first flange, located at the end adjacent to the outer sleeve (when coupled) may be provided with a circumferential internal recess which acts as a seat for an O-ring seal. When the O-ring seal is in place, the O-ring seal is adapted to be located around the end of the insert (when present) and within a recess in the outer sleeve to seal against leakage of fluid from within any of the elements of the cross-flow apparatus. However, the O-ring seal used in the present invention is designed to allow a loose fit as the membrane slides through the O-rings. This arrangement is advantageous in that it avoids two potential problems while installing the membrane tube:

(1) the potential for crushing the thin membrane tube during installation; and
(2) the potential for the thin membrane tube to cut off the curved surface of the O-ring.

With the O-ring seal used in the present invention, when the end ferrules are clamped onto the outer sleeve they squeeze the sides of the O-rings causing them to deform and press onto the outer surface of the tubular membrane and the inner surface of the sleeve, to form a seal. This requires careful dimensioning and tolerances.

However, it will be understood by the person skilled in the art that other means of making seal may suitably be used, for example, use of a screwed fitting tightened to a particular torque which would avoid the need for close tolerances; or clamping parts to a particular force followed by welding (which may be particularly suitable when using a plastic cross-flow apparatus).

The internal diameter of the tubular membrane may be varied. In particular, the internal diameter of the tubular membrane may vary depending upon whether or not an insert is present. Generally, the internal diameter of the tubular membrane will be fairly small. In the absence of an insert the internal diameter of the tubular membrane may be from about 1 mm to about 10 mm, or from about 2 mm to about 8 mm, or from about 4 mm to about 6 mm. When the tubular membrane is intended for use with an insert, the internal diameter of the tubular membrane may be from about 5 mm to about 50 mm, or from about 10 mm to about 50 mm, or from about 20 mm to about 40 mm, or from about 25 mm to about 35 mm. Higher internal diameter of the tubular membrane may only be capable of being subjected to lower injection pressure. The upper limit of the internal diameter of the tubular membrane may depend upon, inter alia, the thickness of the membrane tube, since the cylinder needs to be able to cope with the external injection pressure, and whether it's possible to drill consistent holes through that thickness. The chamber inside the cylindrical membrane usually contains the continuous phase liquid.

In contrast to membrane emulsification using oscillating membranes, in the present invention the membrane, the sleeve and the insert are generally stationary.

As described herein in prior art membranes, such as those described in WO2012/094595 comprise pores in the membrane that are conical or concave in shape. One example is that the pores in the membrane can be laser drilled. Laser drilled membrane pores or through holes will be substantially more uniform in pore diameter, pore shape and pore depth. The profile of the pores may be important, for example, a sharp, well defined edge around the exit of the pore is preferable. It may be desirable to avoid a convoluted path (such as results from sintered membranes) in order to minimise blockage, reduce feed pressures (cf. mechanical strength), and keep an even flowrate from each pore. However, as discussed herein, it is within the scope of the present invention to use pores in which the internal bore is non-circular (for example rectangular slots) or convoluted (for example tapered or stepped diameter to minimise pressure drop).

In the membrane the pores may be uniformly spaced or may have a variable pitch. Alternatively, the membrane pores may have a uniform pitch within a row or circumference, but a different pitch in another direction.

The pores in the membrane may have a pore diameter of from about 1μμm to about 100 μm, or about 10 μm to about 100 μm, or about 20 μm to about 100 μm, or about 30 μm to about 100 μm, or about 40 μm to about 100 μm, or about 50 μm to about 100 μm, or about 60 μm to about 100 μm, or about 70 μm to about 100 μm, or about 80 μm to about 100 μm, or about 90 μm to about 100 μm. In a further embodiment of the invention the pores in the membrane may have a pore diameter of from about 1 μm to about 40 μm, e.g. about 3 μm, or from about 5 μm to about 20 μm, or from about 5 μm to about 15 μm.

In the membrane the shape of the pores may be substantially tubular. However, it is within the scope of the present invention to provide a membrane with uniformly tapered pores. Such uniformly tapered pores may be advantageous in that their use may reduce the pressure drop across the membrane and potentially increase throughput/flux. It is also within the scope of the present invention to provide a membrane in which the diameter is essentially constant, but the internal bore is non-circular (for example rectangular slots) or convoluted (for example tapered or stepped diameter to minimise pressure drop), providing pores with a high aspect ratio.

The interpore distance or pitch may vary depending upon, inter alia, the pore size; and may be from about 1 μm to about 1,000 μm, or from about 2 μm to about 800 μm, or from about 5 μm to about 600 μm, or from about 10 μm to about 500 μm, or from about 20 μm to about 400 μm, or from about 30 μm to about 300 μm, or from about 40 μm to about 200 μm, or from about 50 μm to about 100 μm, e.g. about 75 μm.

The surface porosity of the membrane may depend upon the pore size and may be from about 0.001% to about 20% of the surface area of the membrane; or from about 0.01% to about 20%, or from about 0.1% to about 20%, or from about 1% to about 20%, or from about 2% to about 20%, or from about 3% to about 20%, or from about 4% to about 20%, or from about 5% to about 20, or from about 5% to about 10%.

The arrangement of the pores may vary depending upon, inter alia, pore size, throughput, etc. Generally, the pores may be in a patterned arrangement, which may be a square, triangular, linear, circular, rectangular or other arrangement. In one embodiment the pores are in a square arrangement. When utilising the "push-off" effect as described herein, pore edge effects may be significant, particularly at lower throughput/flux i.e. the "push off" may only be effective at higher universal flux when all pores are active. Consequently, the required throughput/flux may be achieved with a smaller number of pores.

It will be understood that the apparatus of the invention; and in particular the membrane, may comprise known materials, such as glass; ceramic; metal, e.g. stainless steel or nickel; polymer/plastic, such as a fluoropolymer; or silicon. The use of metals, such as stainless steel or nickel, or polymer/plastic, such as a fluoropolymer is advantageous in that, inter alia, the apparatus and/or membranes may be subjected to sterilisation, using conventional sterilisation techniques known in the art, including gamma irradiation where appropriate. The use of polymer/plastic material, such as a fluoropolymer, is advantageous in that, inter alia, the apparatus and/or membrane may be manufactured using injection moulding techniques known in the art.

As described herein an insert may be included in the membrane to facilitate even flow distribution. However, it is within the scope of the cross-flow apparatus of the present invention for the insert to be absent. When an insert is present, the furcation plate may be adapted to split the flow of continuous phase or the disperse phase into a number of branches. Whether the furcation plate splits the continuous phase or the disperse phase will depend upon the direction of flow of the continuous phase, i.e. whether the continuous phase flows through the first inlet or the second inlet. Although the number of furcation plates may be varied, the number selected should be suitable lead to even flow distribution and (at the emulsion outlet end) not have excessive shear. Preferably, when the insert is present the furcation plate is a bi-furcation plate or a tri-furcation plate to provide a uniform continuous phase flow within the annular region between the insert and the membrane. Most preferably the furcation plate is a tri-furcation plate.

The number of orifices provided in the insert may vary depending upon the injection rate, etc. Generally the number of orifices may be from 2 to 6. Preferably the number of orifice is three.

The chamfered region on the insert is advantageous in that it enables the insert to be centred when it is located in position inside the membrane. The external circumference of the ends of the insert has a minimal tolerance with the internal diameter of the tubular membrane. This enables the insert to be accurately centred, thereby providing a consistent annulus leading to a consistent shear. Generally, the chamfered region will comprise a shallow chamfer, which is advantageous in that it evens the flow distribution and allows the use of orifices in the insert with larger cross-sectional area than could be achieved if the flow simply entered through orifices parallel to the axis of the insert. This keeps the fluid velocity down and therefore minimises unwanted pressure losses, and shear on the outlet. The distance between the start of the orifices and the start of the porous region on the tubular membrane allows an even velocity distribution to be established. The radial dimension of the insert is selected to provide an annular depth to provide a certain shear for the flowrates chosen. The axial dimension is designed to generally give a combined orifice area which is greater than both the annular area and the inlet/exit tube area.

Droplet size uniformity is expressed in terms of the coefficient of variation (CV):

$$CV = \frac{\sigma}{\mu} \times 100 \tag{8}$$

where σ is the standard deviation and μ is the mean of the volume distribution curve.

The apparatus of the present invention is advantageous in that, inter alia, it enables droplets to be prepared with a CV of from about 5% to about 50%, or from about 5% to about 40%, or from about 5% to about 30%, or from about 5% to about 20%, e.g. from about 10% to about 15%.

The apparatus of the present invention is further advantageous because it is capable of combining a controlled droplet CV, as herein described, with a high throughput/flux in a stationary system, i.e. a system that is not agitated, e.g. by stirring, membrane oscillation, by pulsing, and the like.

Thus, according to this aspect of the invention there is further provided a cross-flow apparatus for producing an emulsion by dispersing a first phase in a second phase; said cross-flow apparatus capable of having a throughput/flux of from about 1 to about $10^6$ LMH, preparing droplets with a CV of from about 5% to about 50%, or from about 10 to about $10^5$ LMH, or from about 100 to about $10^4$ LMH, or from about 100 to about $10^3$ LMH. According to an alternative aspect of the invention the throughput/flux may be from about 0.1 to about $10^3$ LMH, or from about 1 to about $10^2$ LMH, or from about 1 to about 10 LMH. Such low flux rates are generally suitable for use with a viscous dispersed phase.

More particularly, according to this aspect of the invention there is provided a cross-flow apparatus for producing an emulsion by dispersing a first phase in a second phase; said cross-flow apparatus comprising:

- an outer tubular sleeve provided with a first inlet at a first end; an emulsion outlet at a second end; and a second inlet, distal from and inclined relative to the first inlet;
- a tubular membrane provided with a plurality of pores and adapted to be positioned inside the tubular sleeve; and
- optionally an insert adapted to be located inside the tubular membrane, said insert comprising an inlet end and an outlet end, each of the inlet end and an outlet end being provided with chamfered region; the chamfered region being provided with a plurality of orifices and a furcation plate;
- for producing an emulsion by dispersing a first phase in a second phase; said cross-flow apparatus capable of having a throughput of from about 1 to about $10^6$ LMH, producing emulsion droplets with a CV of from about 5% to about 50%, In one aspect of the invention the cross-flow apparatus includes an insert as herein described and the first inlet is a continuous phase first inlet and the second inlet is a disperse phase inlet; such that the disperse phase travels from outside the tubular membrane to inside.

In another aspect of the invention the cross-flow apparatus does not include an insert and the first inlet is a disperse phase first inlet and the second inlet is a continuous phase inlet; such that the disperse phase travels from inside the tubular membrane to outside.

The process of membrane emulsification is to produce an emulsion, or dispersion usually employs shear at the surface of the membrane in order to detach the dispersed phase liquid drops from the membrane surface, after which they become dispersed in the immiscible continuous phase. High surface shear at the membrane surface is appropriate to the formation of fine dispersions and emulsions but low surface shear, or none at all, is appropriate to the formation of larger liquid drops. In the absence of surface shear, the force to detach the drop from the membrane surface is usually believed to be buoyancy, which counteracts the capillary force—the force retaining the drop at the membrane surface.

However, Kosvintsev reported (Kosvintsev, S. R., 2008. Membrane emulsification: droplet size and uniformity in the absence of surface shear. Journal of Membrane Science, 313 (1-2), pp. 182-189.) that there is observational evidence to suggest that there is an additional force causing detachment from the membrane pores, this force is applicable when there are a large number of drops at the membrane surface—causing drops to deform from their preferred spherical shape. This force is known as the "push-to-detach" or "push-off" force.

Hence, for dispersed drop size modelling, and understanding, there is an additional force due to the presence of neighbouring drops, which deform the drops from their otherwise spherical and minimum energy state and gives rise to a push-off force after which the drops achieve their minimum energy state when they return to a spherical shape, after detachment. In a highly regular membrane, it may be that the presence of this additional force helps to produce more uniformly sized drops.

According to a further aspect of the invention there is provided a method of preparing an emulsion using an apparatus as herein described.

According to a yet further aspect of the invention there is provided an emulsion or dispersion prepared using a method as herein described.

The use of the apparatus is suitable for production of "high technology" products and uses, for example, in chromatography resins, medical diagnostic particles, drug carriers, food, flavourings, fragrances and encapsulation of the aforementioned, that is, in fields where there is a need for a high degree of droplet size uniformity, and above the 10 μm threshold below which simple crossflow with recirculation of the dispersion could be used to generate the drops. The liquid droplets obtained using the apparatus of the present invention could become solid through widely known polymerisation, gelation, or coacervation processes (electrostatically-driven liquid-liquid phase separation) within the formed emulsion.

The present invention will now be described by way of example only, with reference to the accompanying figures in which.

Figure 1A:
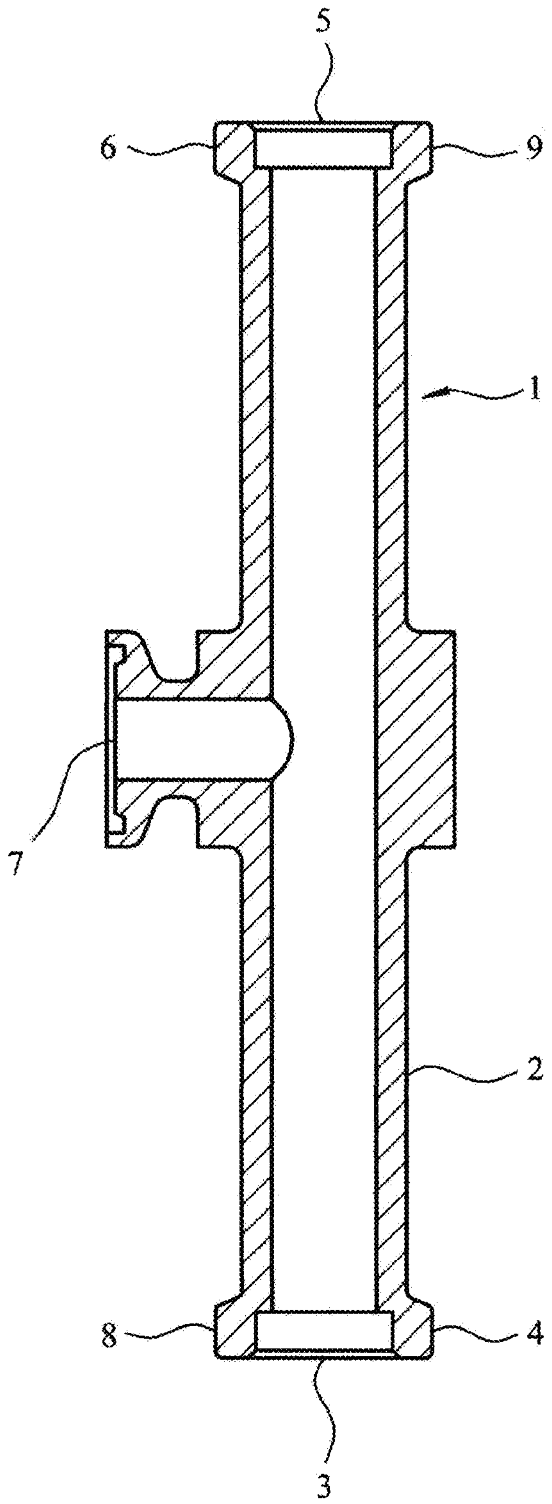
FIG. 1(*a*) is a cross-sectional view of a tubular sleeve and FIG. 1(*b*) is a plan view of the sleeve.
Figure 1B:
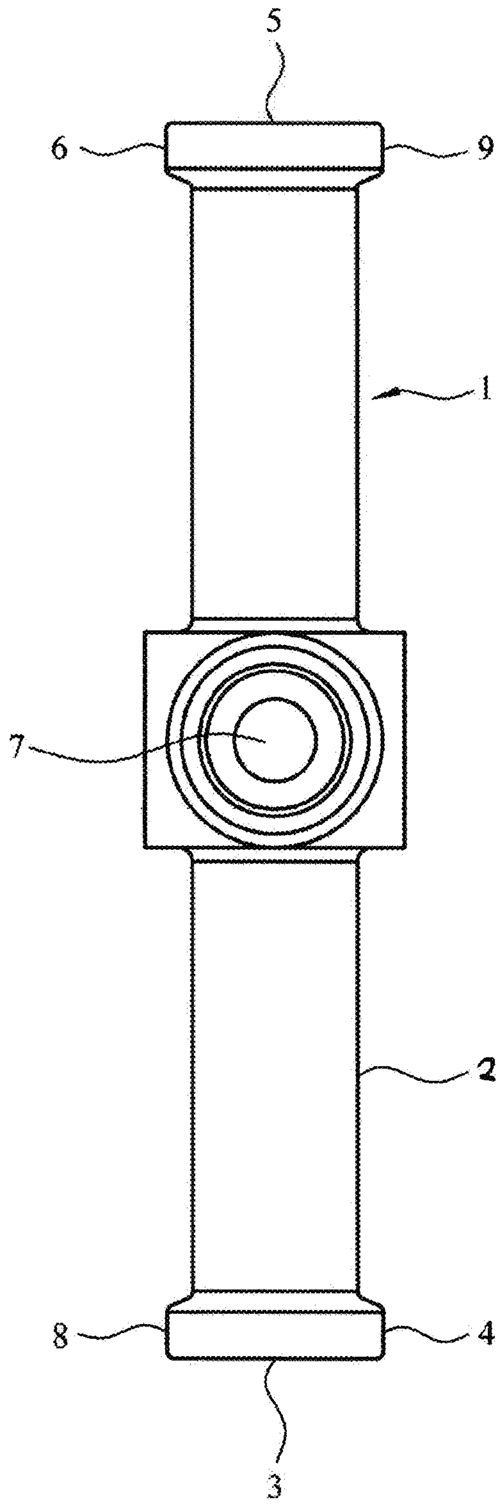

Referring to FIGS. 1(*a*) and 1(*b*), a cross-flow apparatus 1 for, producing an emulsion or dispersion, comprises an outer tubular sleeve 2 provided with a first inlet 3 at a first end 4, an emulsion outlet 5 at a second end 6; and a second inlet 7 distal from and inclined relative to the first inlet 3. Each of the ends 4 and 6 is provided with a flange 8 and 9.

Figure 2:
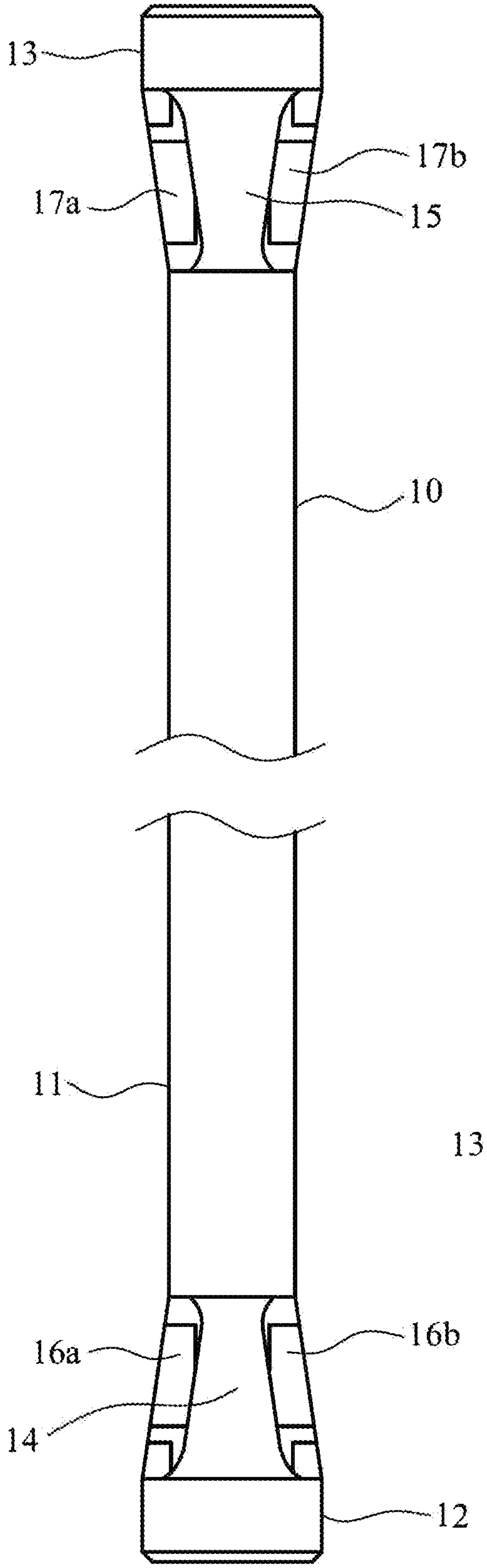
FIG. 2 is a perspective view of an insert.
Figure 3:
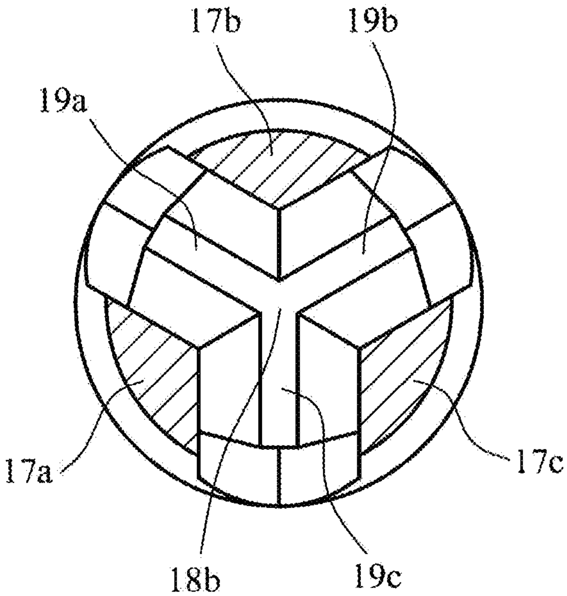
FIG. 3 is a cross-sectional view along line B-B.
Figure 4:
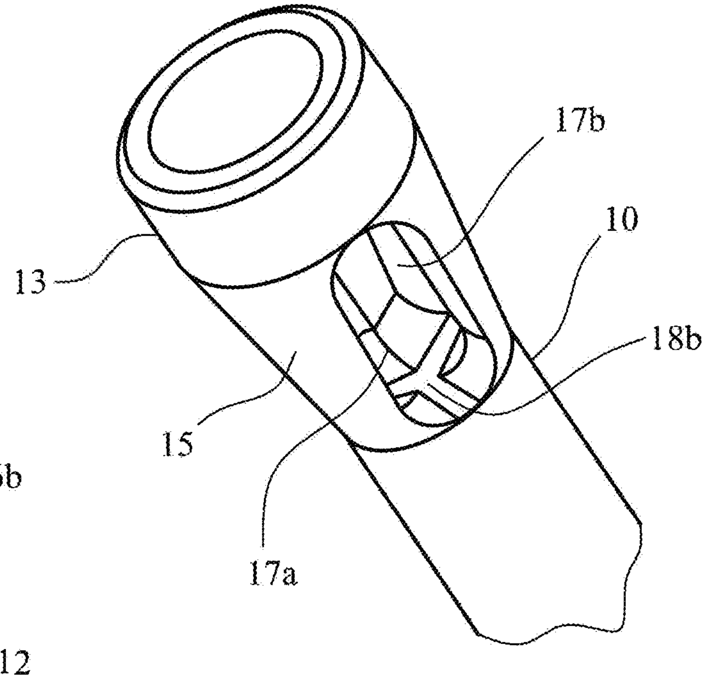
FIG. 4 is a close-up view of an end of the insert.

Referring to FIGS. 2 to 4, an insert 10 comprises a longitudinal rod 11 with first and second hollow chamfered ends 12 and 13. Each of the chamfered ends 12 and 13 comprises a chamfered surface 14 and 15 and each chamfered surface is provided with three orifices 16*a* and 16*b* (16*c* not shown); and 17*a*, 17*b* and 17*c*. Internally each chamfered 12 and 13 end is provided with a trifurcation plate 18*a* (not shown) and 18*b* which comprises fins 19*a*, 19*b* and 19*c*.

Figure 5A:
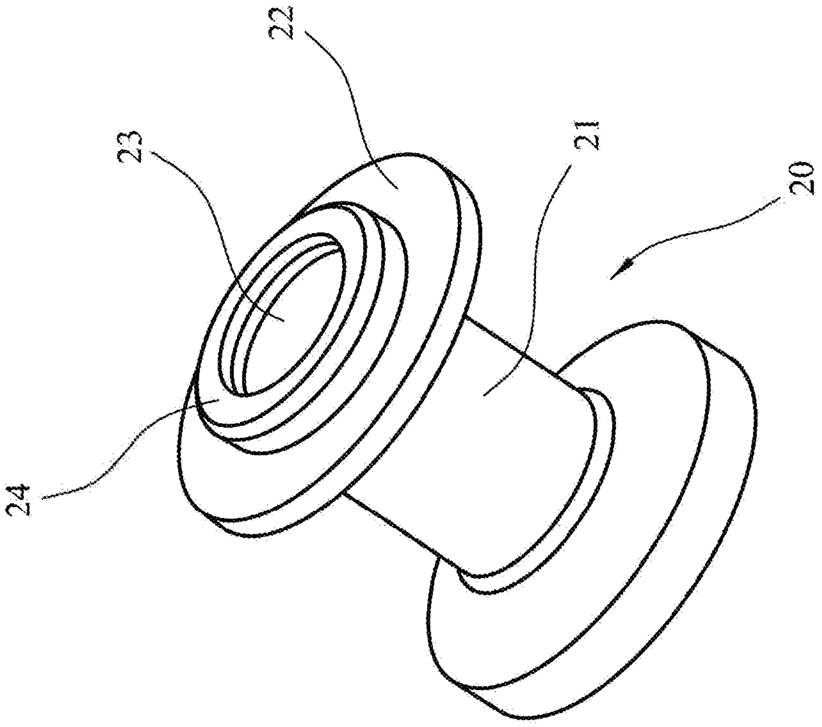
FIG. 5(*a*) is a perspective view of a seal ferrule and FIG. 5(*b*) is a cross-sectional view of a seal ferrule.
Figure 5B:
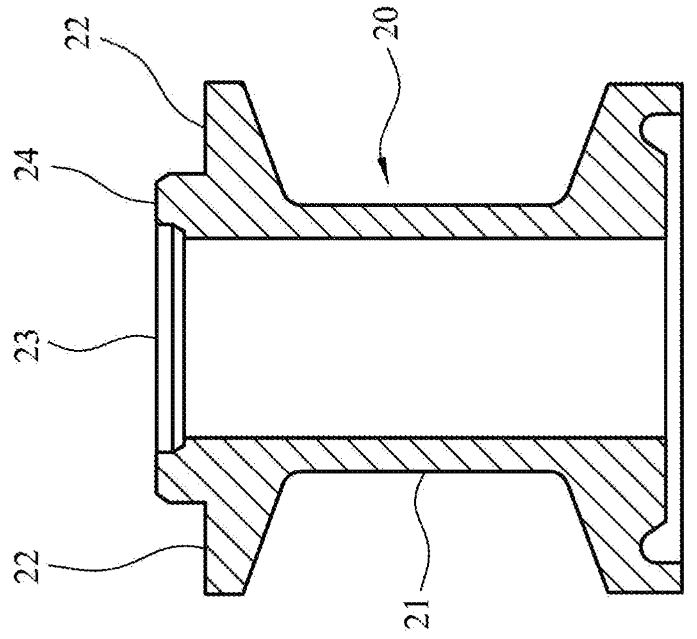

Referring to FIGS. 5(*a*) and 5(*b*), a seal ferrule 20, is adapted to be positioned at each end 4 and 6 of the tubular sleeve 2. The seal ferrule 20 comprises a cylinder 21 with a flange 22 at one end 23 and a protrusion 24 which acts a seat for an O-ring seal 25 (not shown). In use the flange 23 is adapted to mate with flanges 8 and 9 of the sleeve 2.

Figure 6:
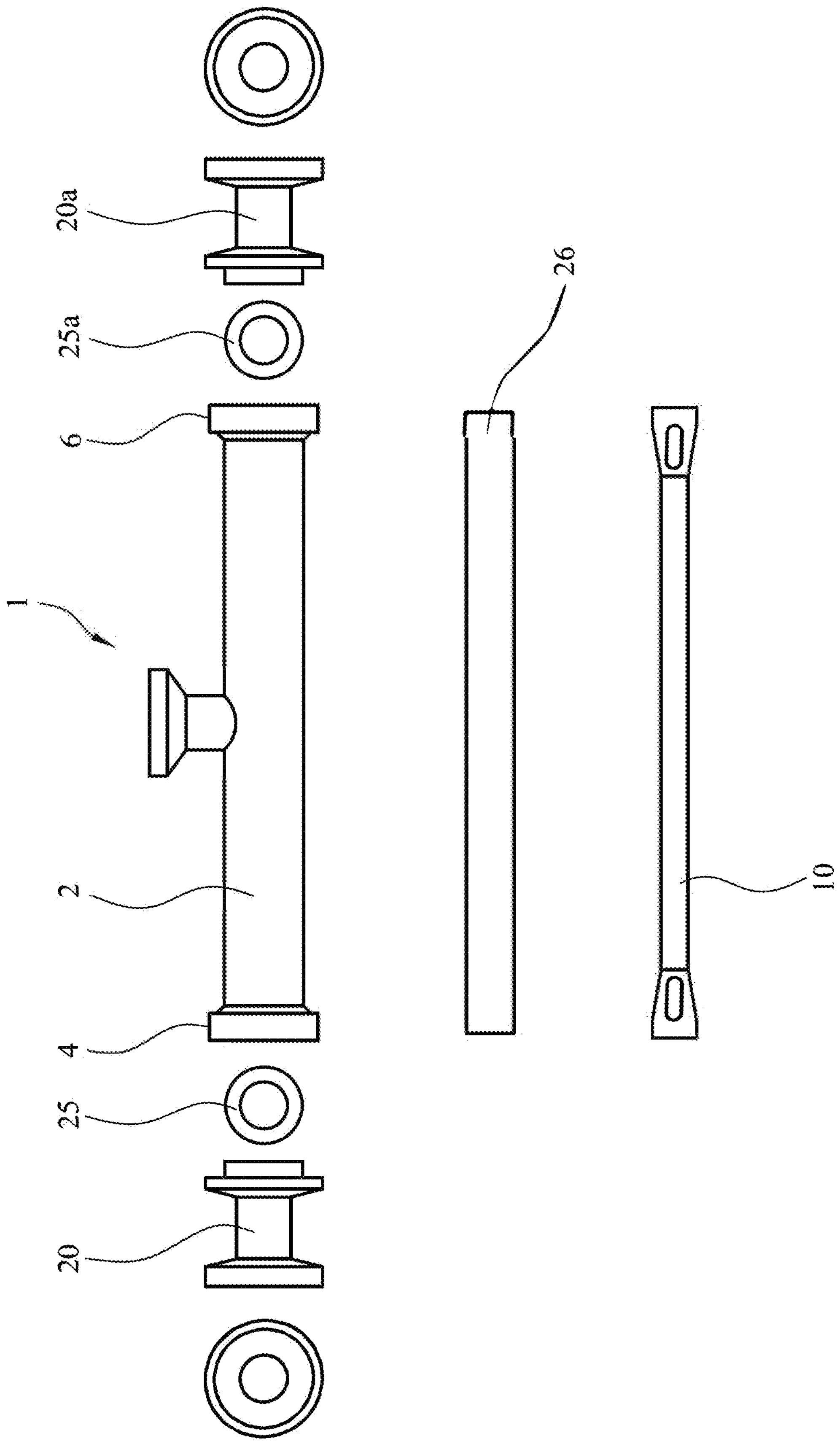
FIG. 6 is a perspective view of a disassembled cross-flow apparatus.

Referring to FIG. 6, a disassembled cross-flow apparatus 1 comprises an outer tubular sleeve 2, a membrane 26 and an insert 10. Each end 4 and 6 of the sleeve 2 is provided with a seal ferrule 20 and 20*a* and an O-ring seal 25 and 25*a*.

Figure 7:
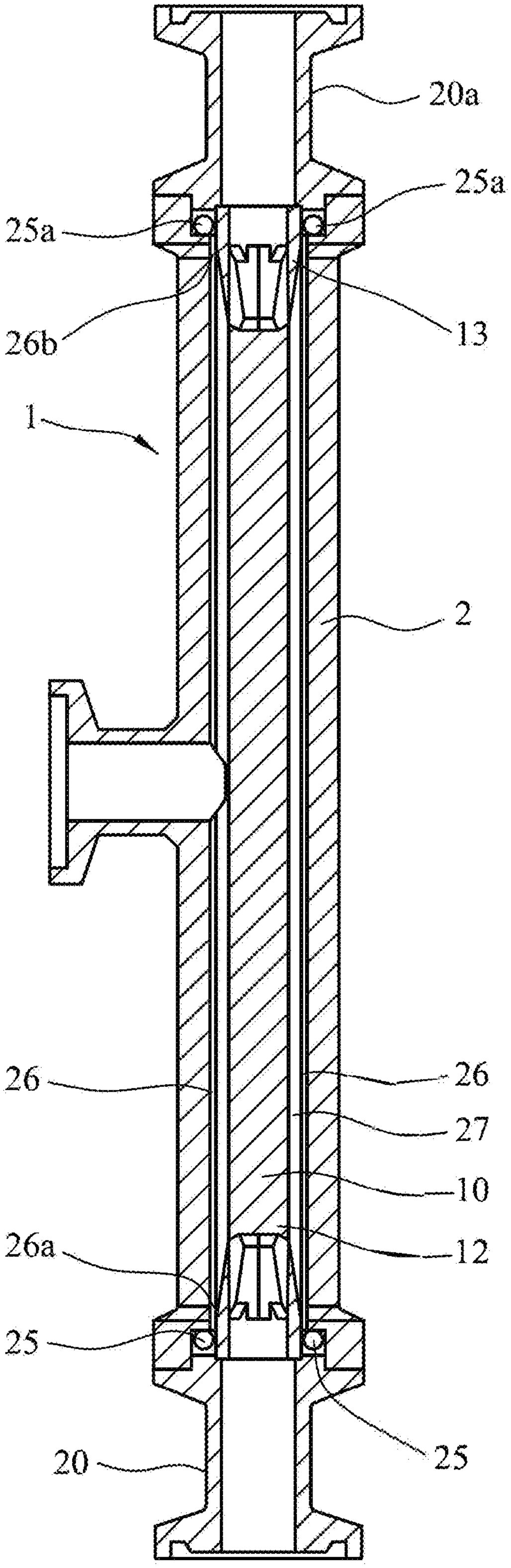
FIG. 7 is a cross-sectional view of a tubular sleeve with a membrane and insert in situ.
Figure 8:
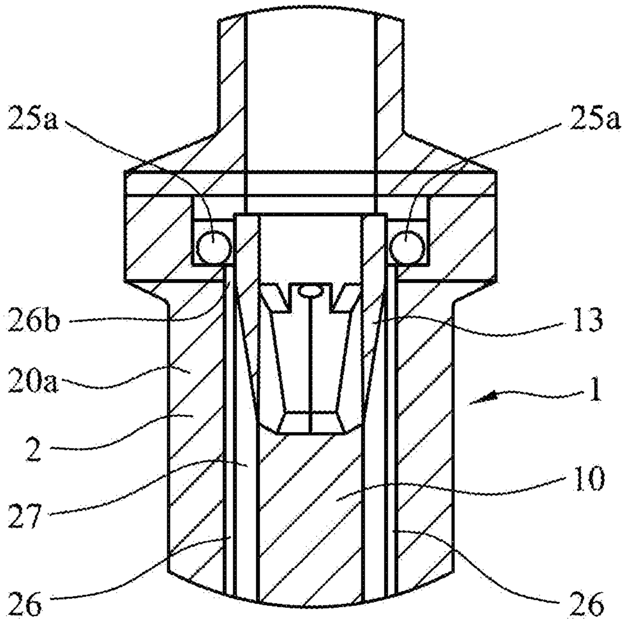
FIG. 8 is a close-up view of an end of the tubular sleeve with a membrane and insert in situ.

Referring to FIGS. 7 and 8, an assembled cross-flow apparatus 1 comprises an outer sleeve 2, with a membrane 26 located inside the sleeve 2; and an insert 10 located inside the membrane 26. The insert 10 is located centrally within membrane 26 and each end 26*a* and 26*b* of the membrane 26 is sealed by an O-ring seal 25 and 25*a* which is compressed by the seal ferrule 20 and 20*a* .

In use, in the embodiment shown, a continuous phase will pass through the orifices 16*a* and 16*b* (16*c* not shown) at the inlet end 4 of the sleeve 2 and through a gap 27 between the insert 2 and the membrane 26. A disperse phase will pass through the branched second inlet 7 and through the membrane 26 into gap 27 to contact with the continuous phase to form an emulsion or dispersion. Said emulsion or dispersion will flow out of the cross-flow apparatus 1 at the outlet end 6.

It will be understood by the person skilled in the art that this is one embodiment of the present invention. Although not illustrated here, it will be understood that the flow may be may be in the opposite direction to the described, for example the disperse phase can be introduced at inlet end of the sleeve and the continuous phase introduced at the second branched inlet. Such additional embodiments should be deemed to be within the scope of the present invention.

The invention claimed is:

1. A cross-flow apparatus for producing an emulsion or dispersion by dispersing a first phase in a second phase; said cross-flow apparatus comprising:

an outer tubular sleeve provided with a first inlet at a first end; an emulsion outlet; and a second inlet, distal from and inclined relative to the first inlet;

a tubular membrane provided with a plurality of pores and adapted to be positioned inside the tubular sleeve; and an insert adapted to be located inside the tubular membrane, said insert comprising an inlet end and an outlet end, each of the inlet end and an outlet end being provided with chamfered region; the chamfered region is provided with a plurality of orifices and a furcation plate;

and wherein the emulsion outlet is generally at a second end of the tubular sleeve;

and wherein the inlet and outlet ends of the outer sleeve are provided with a seal assembly comprising a tubular ferrule provided with a flange at each end.

2. A cross-flow apparatus according to claim 1 wherein the membrane pores are laser drilled.

3. A cross-flow apparatus according to claim 2 wherein the membrane pores are substantially uniform in pore diameter, pore shape and pore depth.

4. A cross-flow apparatus according to claim 3 wherein the membrane pores are generally uniformly spaced.

5. A cross-flow apparatus according to claim 2 wherein the pores have a diameter of from about 1 μm to about 100 μm.

6. A cross-flow apparatus according to claim 2 wherein the shape of the pores is substantially tubular.

7. A cross-flow apparatus according to claim 2 wherein the interpore distance is from about 1 μm to about 1,000 μm.

8. A cross-flow apparatus according to claim 2 wherein the surface porosity of the membrane may be from about 0.001% to about 20% of the surface area of the membrane.

9. A cross-flow apparatus according to claim 2 wherein the pores are in a patterned arrangement.

10. A cross-flow apparatus according to claim 9 wherein the patterned arrangement is a square, triangular, linear, circular or rectangular arrangement.

11. A cross-flow apparatus according to claim 10 wherein the patterned arrangement is a square arrangement.

12. A cross-flow apparatus according to claim 1 wherein the membrane comprises a material selected from glass; ceramic; metal; polymer/plastic or silicon.

13. A cross-flow apparatus according to claim 12 wherein the membrane comprises a metal.

14. A cross-flow apparatus according to claim 13 wherein the metal is stainless steel.

15. A cross-flow apparatus according to claim 1 wherein the furcation plate is a bi-furcation plate or a tri-furcation plate.

16. A cross-flow apparatus according to claim 15 wherein the furcation plate is a tri-furcation plate.

17. A cross-flow apparatus according to claim 15 wherein the number of orifices provided in the insert is from 2 to 6.

18. A cross-flow apparatus according to claim 17 wherein the number of orifices provided in the insert is three.

19. A cross-flow apparatus according to claim 15 wherein the chamfered region on the insert comprises a shallow chamfer.

20. A cross-flow apparatus according to claim 1 wherein the apparatus is suitable for preparing droplets with a coefficient of variation of from about 5% to about 50%.

21. A cross-flow apparatus according to claim 1 wherein the apparatus is capable of a throughput of from 1 to $10^6$ LMH.

22. A cross-flow apparatus according to claim 1 wherein a first flange located at the end adjacent to the outer sleeve (when coupled) is provided with a circumferential internal recess which acts as a seat for an O-ring seal.

23. A cross-flow apparatus according to claim 22 wherein the O-ring seal allows a loose fit as the membrane slides through the O-ring.

24. A cross-flow apparatus according to claim 1 wherein the tubular membrane is located centrally within the outer sleeve, such that the spacing between the membrane and the sleeve comprises an annulus, of equal or substantially equal dimensions at any point around the tubular membrane.

25. A cross-flow apparatus according to claim 24 wherein the spacing is from about 0.05 to about 10 mm.

26. A cross-flow apparatus according to claim 1 wherein the insert is tapered.

27. A cross-flow apparatus according to claim 1 wherein the apparatus includes an insert and the tubular membrane is located centrally within the outer sleeve, such that the spacing between the membrane and the insert comprises an annulus, of equal or substantially equal dimensions at any point around the insert.

28. A cross-flow apparatus according to claim 1 wherein the cross-flow apparatus comprises a plurality of tubular membranes wherein the plurality of membranes is grouped as a cluster of membranes positioned alongside each other and wherein each membrane has an insert located inside it.

29. A cross-flow apparatus according to claim 28 wherein each membrane has an insert located inside it.

30. A cross-flow apparatus according to claim 28 wherein a plurality of membranes is grouped as a cluster of membranes positioned alongside each other.

31. A cross-flow apparatus according to claim 1 wherein the seal assembly on the inlet and outlet ends of the outer sleeve are the same.

* * * * *